United States Patent
D'Alessio et al.

(10) Patent No.: US 7,993,006 B2
(45) Date of Patent: Aug. 9, 2011

(54) SYSTEM AND METHOD FOR POWER CONTROL FOR INFORMATION HANDLING SYSTEM PERIPHERALS

(75) Inventors: Samuel Nicklaus D'Alessio, Round Rock, TX (US); Andrew T. Sultenfuss, Leander, TX (US)

(73) Assignee: Dell Products L. P., Round Rock, TX (US)

( * ) Notice: Subject to any disclaimer, the term of this patent is extended or adjusted under 35 U.S.C. 154(b) by 684 days.

(21) Appl. No.: 12/112,139

(22) Filed: Apr. 30, 2008

(65) Prior Publication Data
US 2009/0273764 A1    Nov. 5, 2009

(51) Int. Cl.
G03B 21/14    (2006.01)
G06F 1/26    (2006.01)

(52) U.S. Cl. .................... 353/30; 353/121; 713/300

(58) Field of Classification Search .............. 353/30, 353/121; 713/300
See application file for complete search history.

(56) References Cited

U.S. PATENT DOCUMENTS

| | | | | |
|---|---|---|---|---|
| 6,774,604 B2 * | 8/2004 | Matsuda et al. | | 320/110 |
| 6,874,091 B2 * | 3/2005 | Min | | 713/300 |
| 7,285,874 B2 * | 10/2007 | Menas et al. | | 307/80 |
| 7,296,898 B2 * | 11/2007 | Wu | | 353/52 |
| 7,383,371 B2 * | 6/2008 | Kasahara | | 710/305 |
| 7,424,569 B2 * | 9/2008 | Matsuda | | 710/316 |
| 7,682,029 B2 * | 3/2010 | Jayaram et al. | | 353/87 |
| 7,721,122 B2 * | 5/2010 | Brundridge | | 713/300 |
| 7,768,152 B2 * | 8/2010 | Menas et al. | | 307/38 |
| 7,793,118 B2 * | 9/2010 | Ho et al. | | 713/300 |
| 2002/0194468 A1 * | 12/2002 | Betts-LaCroix et al. | | 713/100 |
| 2003/0030412 A1 * | 2/2003 | Matsuda et al. | | 320/127 |
| 2003/0231168 A1 * | 12/2003 | Bell et al. | | 345/173 |
| 2005/0138239 A1 * | 6/2005 | Kasahara | | 710/33 |
| 2005/0138446 A1 * | 6/2005 | Matsuda | | 713/300 |
| 2006/0129253 A1 * | 6/2006 | Menas et al. | | 700/22 |
| 2006/0129721 A1 * | 6/2006 | Betts-LaCroix et al. | | 710/104 |
| 2007/0225833 A1 * | 9/2007 | Menas et al. | | 700/22 |
| 2008/0140887 A1 * | 6/2008 | Gallant et al. | | 710/100 |
| 2008/0309313 A1 * | 12/2008 | Farrar et al. | | 323/351 |
| 2009/0063877 A1 * | 3/2009 | Lewis et al. | | 713/310 |
| 2009/0198839 A1 * | 8/2009 | Banerjee et al. | | 710/10 |
| 2009/0262306 A1 * | 10/2009 | Quinn et al. | | 353/25 |
| 2009/0273764 A1 * | 11/2009 | D'Alessio et al. | | 353/85 |

OTHER PUBLICATIONS http://www.usbpluspower.org/-USBPlusPowerTechnology Plus Power. "Universal Serial Bus" USBIF, 1999, 26 pg.

* cited by examiner

*Primary Examiner* — John Lee
(74) *Attorney, Agent, or Firm* — Hamilton & Terrile, LLP; Robert W. Holland

(57) ABSTRACT

An information handling system powers a projector through a communication interface, such as a USB interface, by selectively enabling first or second power levels through the communication interface. Initially, the communication interface provides a first minimal power level to run a controller on the projector. The controller communicates with the information handling system to establish approval for power at a second level, such as by communicating an identifier or a power level to the information handling system. The projector approves a power draw at the second power level based upon information received from the information handling system. The projector draws power at a second level that is adequate to fully operate the projector for presentation of visual images.

20 Claims, 4 Drawing Sheets

SYSTEM AND METHOD FOR POWER CONTROL FOR INFORMATION HANDLING SYSTEM PERIPHERALS

BACKGROUND OF THE INVENTION

1. Field of the Invention

The present invention relates in general to the field of information handling system attached peripherals, and more particularly to a system and method for power control for information handling system peripherals.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically run applications that generate information for presentation as visual images. Visual information is typically generated with a video graphics card and communicated to a display through a variety of standardized connections, such as VGA, DisplayPort, LVDS, USB or DVI connections. Desktop or tower information handling systems generally present information at external peripheral displays while portable information handling systems typically include an integrated display along with the ability to interact with external peripheral displays. One type of external peripheral display that is commonly used with portable information handling systems is the graphics projector. Projectors typically offer the same high resolution presentations that are available from liquid crystal displays (LCD), however, projectors project the image through a lens using a bright illumination source, such as a halogen lamp, so that the display is visible to a number or people, such as for a business presentation. The use of a data or graphics projector does add some inconvenience to an end user who has to carry the projector to the presentation, find power for the projector to use and set the projector up for use.

Recent innovations have made data projectors more convenient to use by shrinking the size of the housing that holds the projector. Such "pocket" or "pico" projectors manage to have a reduced overall size by using LED lights instead of halogen bulbs to illuminate a visual image, such as an image created with DLP technology. LED lights are typically smaller than halogen bulbs and also typically require supporting subsystems that use less room than those used by halogen bulbs. For example, LED lights run on relatively low direct current (DC) voltages as compared to high alternating current (AC) voltages needed for illumination of halogen bulbs, which generally requires a ballast to provide power to the bulb. As another example, LED lights do not typically generate substantial amounts of heat as compared with halogen bulbs, which generally require a cooling subsystem to remove the excess heat. Another advantage to LED lights used in pocket projectors is that they tend to consume less power so that, all factors considered, pocket projectors tend to be simpler to operate than conventional projectors. With their reduced power consumption, some pocket projectors are able to operate on battery power using batteries recharged by AC/DC power adapters.

SUMMARY OF THE INVENTION

Therefore a need has arisen for a system and method which provides power to a projector or other peripheral from an information handling system.

In accordance with the present invention, a system and method are provided which substantially reduce the disadvantages and problems associated with previous methods and systems for powering projectors. Power is provided over a communication interface at a first level until a predetermined condition is met, after which power is drawn at a second level. The first level provides a relatively small amount of power sufficient to operate an input/output interface that communicates information to allow power to increase to the second level so that the projector presents visual images with power provided by the information handling system over the communication interface at the second level.

More specifically, an information handling system has plural processing components that cooperate to process information, such as by an application that generates visual information for presentation as visual images. A projector interfaces with the information handling system over a communication interface to accept the visual information for presentation as visual images. A projector controller running on the projector and a projector manager running on the information handling system communicate identification information across the communication interface so that the projector transitions from drawing power at a first level sufficient to support the interface to a second level sufficient to operate the projector for presentation of the visual images. For example, the communication interface is a USB interface that initially provides minimal power in accordance with the USB specification. The projector manager provides an approval to the projector controller to transition to a higher power draw level at which the projector is able to operate to present visual information. The approval is based upon communication of identification information that identifies the information handling system as able to provide a higher power level so that the projector can draw power from the information handling system at the higher power level.

The present invention provides a number of important technical advantages. One example of an important technical advantage is that a projector is powered directly from an information handling system without exceeding the capability of the information handling system output power. Receiving power directly from an information handling system simplifies projector setup by avoiding the use of an external power connection for the projector. Setup is simplified even more where power is provided through a communication interface, such as a USB interface. Logic internal to the information handling system and the projector verify that the power needed by the projector is available from the information handling system before power is applied. If the information handling system cannot support the power needs of the projector, the end user is notified and minimal power is applied so that fuses and other protective circuits within the information handling system are not activated.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
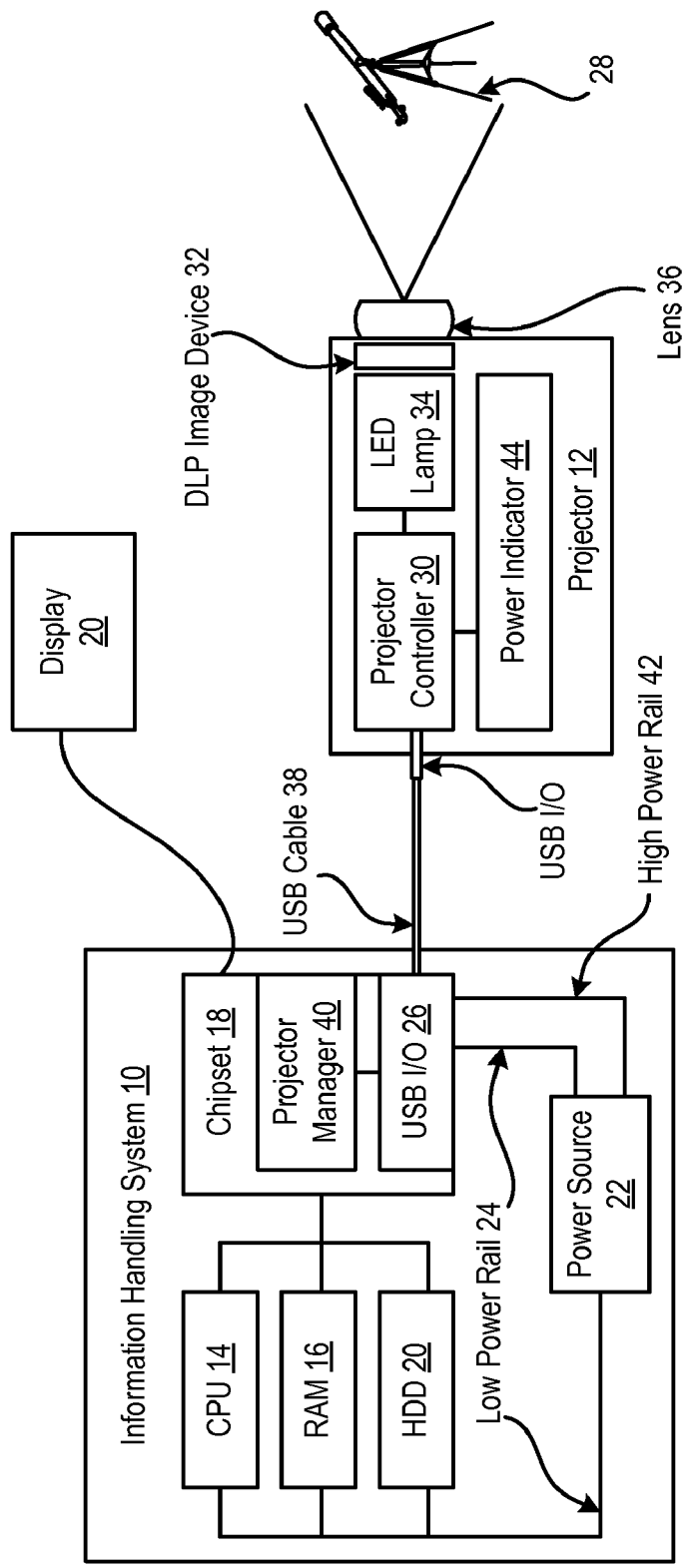
FIG. 1 depicts a block diagram of an information handling system configured to power a projector through a communication interface.

Referring now to FIG. 1, a block diagram depicts an information handling system 10 configured to power a projector 12 through a communication interface. Information handling system 10 processes information with a plurality of processing components that cooperate under the control of firmware and an operating system. For example, a CPU 14 processes information stored in RAM 16 under the management of a chipset 18, such as by running an application stored in a hard disk drive 20. Applications running on the processing components generate visual information for presentation as visual images at a display 20. The processing components receive power from a power source 22, such as through a low power rail 24. A communication interface 26, depicted as a USB interface in the example embodiment, communicates visual information to projector 12 for presentation as a projected visual image 28. The visual information is accepted at a projector controller 30, such as a scalar or other similar processing component, and provided to an image device 32, such as a DLP device, which generates the visual image. A lamp 34, such as an LED lamp, illuminates the visual image in alignment with a lens 36 so that image 28 is present distal projector 12.

In operation, projector 12 connects to communication interface 26 with a cable 38, such as a USB cable. Upon initial interface detection, communication interface 26 provides a low power current across cable 38 to projector 12. As an example, a standard USB interface provides a current of approximately one-half an Amp so that the total power is minimal. Projector controller 30 uses the initial application of power to establish a communication link with a projector manager 40 running, as an example, in a firmware of chipset 18 or, alternatively, as a driver of the operating system of information handling system 10. Projector manager 40 receives identification information from projector controller 30 which projector manager 40 applies to determine whether to provide a higher power level across communication cable 38. For example, projector controller 30 provides an identifier that identifies the type of projector for projection manager 40. Projection manager 40 provides a higher power level if the identifier indicates that projector 12 is a model adapted to accept increased power over cable 38. As another example, projector controller 30 sends a maximum power level that projector 12 is equipped to accept over cable 38 and projection manager 40 approves increased power if the maximum power level is compatible with information handling system 10. In alternative embodiments, projector manager 40 sends identification information or maximum power information to projector controller 30 which applies the information to determine if projector 12 can accept increased power through cable 38.

Once projection manager 40 and projector controller 30 determine that an increased power level is appropriate, projector controller 30 initiates a graduated increase in power drawn from information handling system 10. In one embodiment, information handling system 10 adapts to the increased power draw by interfacing a high power rail 42 with communication cable 38. In another embodiment, the increased power is drawn as needed with a higher power level available at communication interface 26. The higher power level provides adequate power to operate projector 12 without other power sources. For example, the initial power is applied at a current of one-half an Amp and the increased power is provided at a current of up to four Amps, the maximum amount consumed by projector 12. In another embodiment, projector controller 30 limits the power drawn by projector 12 to an amount available from information handling system 10, such as by limiting the brightness at which LED lamp 34 illuminates. If projector 12 fails to get an indication from information handling system that an increased power is available, projector controller 30 illuminates a power indicator 44, such as an LED on the outer surface of projector 12, to indicate to the user that an outside power source is needed, such as a power adapter or a battery.

Figure 2:
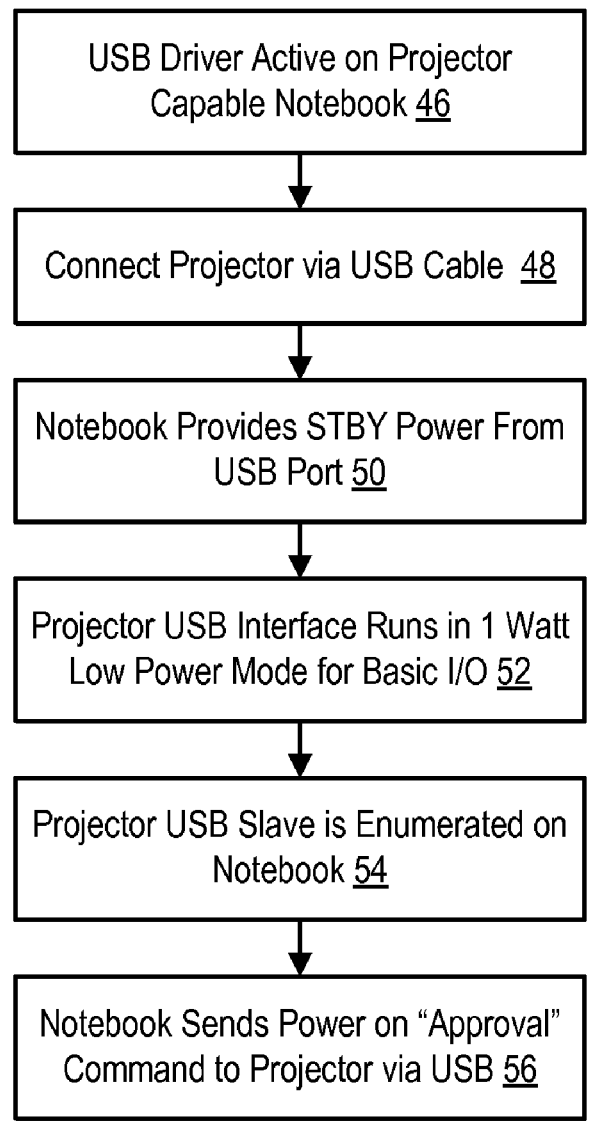
FIG. 2 depicts a flow diagram of a process for communication of a power level for use to power a projector through a communication interface.

Referring now to FIG. 2, a flow diagram depicts a process for communication of a power level for use to power a projector through a communication interface. The process begins at step 46 with activation of a USB driver at the information handling system to support communication with a projector. The USB driver that allows a second power level to an attached peripheral will not install on an information handling system unless the system has physical circuitry to support the second power level. At step 48, a cable connects a USB port of the projector with a USB port of an information handling system to provide a connection for communication of information and power. At step 50, the portable information handling system provides standby power to the projector through the USB cable. Power provided through the USB port conforms with the USB standard, such as power of approximately one-half an Amp, and is sufficient to run processing components on the projector. At step 52, the projector runs in one Watt low power mode to manage basic input/output functionality. At step 54, the projector USB slave is enumerated on the portable information handling system so that the projector is able to communicate with the information handling system, such as by sending an identifier to the information handling system. At step 56, the portable information handling system sends a power on approval command to the projector through the USB interface to indicate that the projector may operate in a high power mode. Initiation of the approval command may be in response to a query by the projector, automatic without any input from the projector and may include information, such as the maximum power that the projector is allowed to draw.

Figure 3:
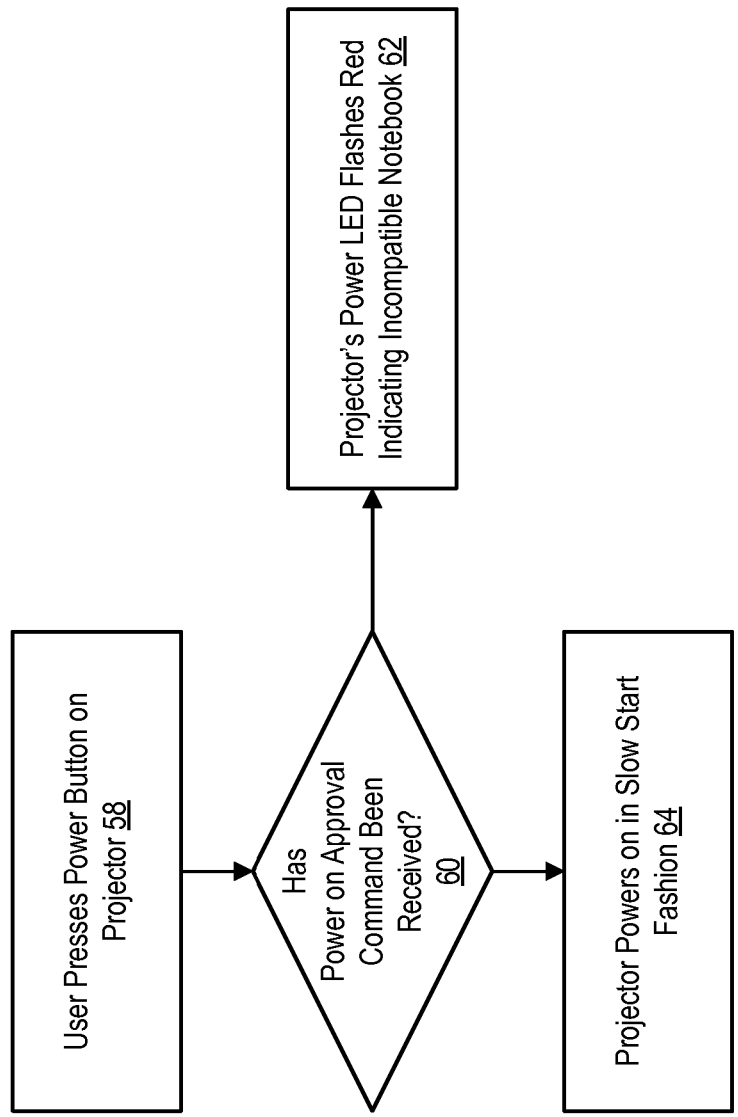
FIG. 3 depicts a flow diagram of a process for a projector to determine if power is available through a communication interface.
Figure 4:
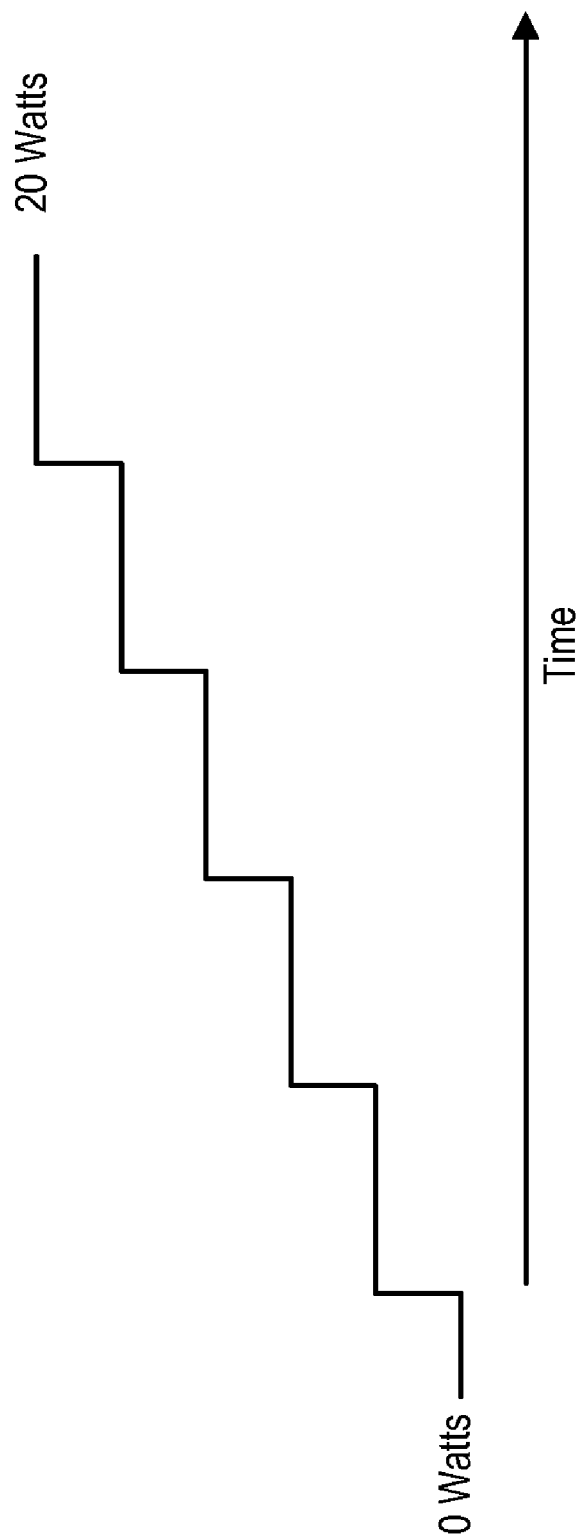
FIG. 4 depicts incremental increases in power across a communication interface to transition from a first lower power level to a second higher power level.

Referring now to FIG. 3, a flow diagram depicts a process for a projector to determine if power is available through a communication interface. The process begins at step 58 with activation of a power button at the projector. At step 60, a determination is made of whether an approval was received to power on fully using power received from the information handling system through the USB interface. If approval is not received, the process continues to step 62 to illuminate a power indicator LED at the projector to indicate with an end user that the information handling system is not compatible with the projector for purposes of providing power adequate to operate the projector for presentation of images. If approval is received at step 60, the process continues to step 64 to apply power to the projector in a slow start fashion. FIG. 4 depicts incremental increases in power across a communication interface to transition from a first lower power level to a second higher power level. Power increases from the first level of approximately 1 Watt to a fully operational level of approximately 20 Watts over a time period so that arcing does not occur between the cable and connector during connection of the cable. In alternative embodiments, the high power level might be set to a value communicated by the information handling system and the projector may run at a reduced power level with reduced lamp illumination to maintain its power consumption within limits set by the information handling system. Although the present disclosure addresses an embodiment that powers a projector, in alternative embodiments, other types of peripherals that receive power from an information handling system might be powered instead of a projector.

Although the present invention has been described in detail, it should be understood that various changes, substitutions and alterations can be made hereto without departing from the spirit and scope of the invention as defined by the appended claims.

What is claimed is:

1. An information handling system comprising:
    plural processing components operable to cooperate to generate visual information;
    a projector interface in communication with the processing components and operable to provide the visual information to a projector for presentation as visual images, the projector interface further operable to provide power to the projector at first and second power levels; and
    a projector manager running on a processing component and operable to communicate with the projector through the projector interface while providing power at the first power level to selectively allow the projector to receive power at the second power level if the projector provides predetermined identification information to the projector manager.

2. The information handling system of claim 1 wherein the projector interface comprises a USB interface.

3. The information handling system of claim 1 wherein the projector manager communicates with the projector by requesting an identifier from the projector.

4. The information handling system of claim 3 wherein the projector manager allows the projector to receive power if the identifier matches a predetermined identifier stored on the information handling system.

5. The information handling system of claim 1 further comprising:
    a power source operable to power the processing components and having first and second power levels;
    wherein the projector manager selectively allows the projector to receive power at the second level by selectively switching the second power level to interface with the projector interface.

6. The information handling system of claim 1 further comprising:
    a projector operable to present the visual information as visual images, the projector having a projector controller operable to communication with the projector manager through the projector interface, the projector controller further operable to limit power drawn through the projector interface to the first level until approval for power draw at the second level is provided from the projector manager.

7. The information handling system of claim 6 further comprising:
    a visual indicator on the projector interfaced with the projector manager;
    wherein the projector controller is further operable to illuminate the visual indicator if power draw at the second level is refused by the information handling system.

8. The information handling system of claim 7 wherein the visual indicator comprises an LED on an outer surface of the projector.

9. The information handling system of claim 1 wherein the projector manager transitions from the first power level to the second power level in a plurality of graduated increases.

10. A method for power control of an information handling system projector, the method comprising:
    connecting a cable between an information handling system and a projector;
    providing power at a first level from the information handling system to the projector;
    communicating identification information between the information handling system and the projector;
    analyzing the identification information to determine if the information handling system has power available for the projector at a second level; and
    providing power from the information handling system to the projector at the second level in response to the analyzing.

11. The method of claim 10 wherein communicating identification information further comprises communicating an identifier associated with the projector to the information handling system.

12. The method of claim 11 wherein analyzing the identification information further comprises confirming at the information handling system that the identifier is associated with a power usage of the second level.

13. The method of claim 10 wherein communicating identification information further comprises communicating a power usage level associated with the projector to the information handling system.

14. The method of claim 13 wherein analyzing the identification information further comprises confirming that the information handling system has power available to apply across the cable of at least the power usage level.

15. The method of claim 10 wherein the cable comprises a USB cable.

16. The method of claim 10 wherein providing power at the second level further comprises:
   incrementally increasing the power from the first level to the second level.

17. A projector comprising:
   an image device operable generate visual images from visual information;
   an LED lamp operable to illuminate the visual image;
   a lens aligned with the image device and LED lamp to project the image at a distal point;
   a cable interface operable to accept visual information and power from an information handling system; and
   a controller interfaced with the cable interface, the controller operable to communicate with the information handling system through the cable interface having power from the information handling system at a first level, to request power from the information handling system at a second level and to draw power at the second level after authorization is communicated from the information handling system.

18. The projector of claim 17 wherein the cable interface comprises a USB interface.

19. The projector of claim 18 wherein power at the second level comprises power sufficient to operate the projector for the presentation of the visual images.

20. The projector of claim 17 wherein the controller requests power at a second level by communicating an identifier to the information handling system.

* * * * *